United States Patent Office 3,491,121
Patented Jan. 20, 1970

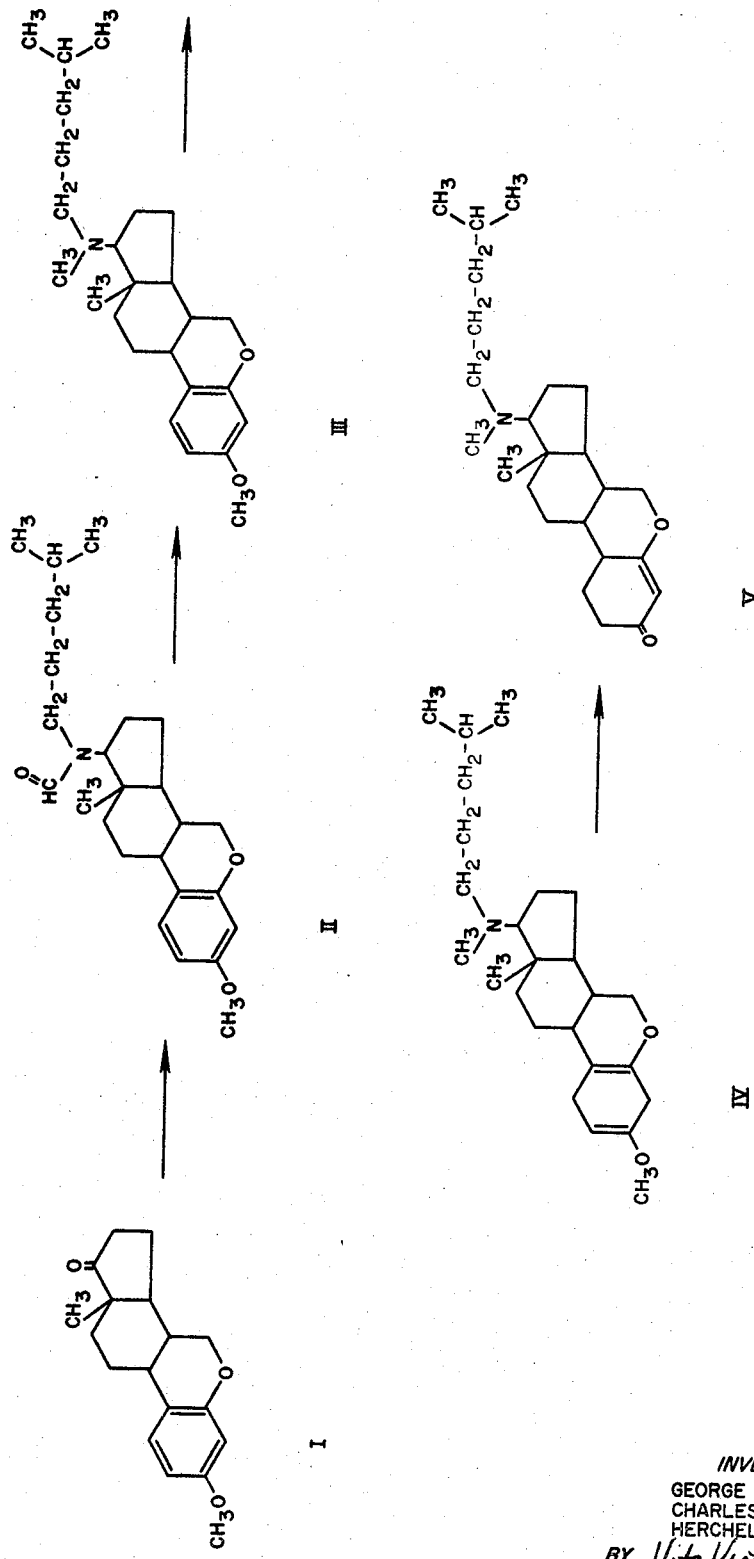

3,491,121
13-ALKYL-17-ALKYLAMINO-6-OXAGONANES
George H. Douglas, Paoli, Charles R. Walk, King of Prussia, and Herchel Smith, Wayne, Pa., assignors to American Home Products Corporation, a corporation of Delaware
Continuation of application Ser. No. 536,361, Mar. 22, 1966. This application Sept. 17, 1968, Ser. No. 760,223
Int. Cl. C07d *101/00;* A61k *27/00*
U.S. Cl. 260—345.3                      19 Claims

---

ABSTRACT OF THE DISCLOSURE

The preparation of novel unsaturated A-ring 6-oxagonanes bearing an alkylamino group at the 17-position, which exhibit a blood lipid lowering effect is described.

---

This application is a continuation of application Ser. No. 536,361, filed Mar. 22, 1966, now abandoned.

This invention relates to compositions of matter classifiable in the art of chemistry as unsaturated 13-alkyl-17-alkylamino-6-oxagonanes, and to intermediates for making them.

In accordance with conventional chemical usage, compositions of this invention which posess the normal stereochemical configuration are named as unsaturated 6-oxagonanes. Compositions of this invention which possess an isomeric stereochemical configuration are designated by naming the position at which the isomerism occurs, e.g., 6-oxa-8-isogonane. Furthermore, while the unsaturated 6-oxagonane compositions of the invention are named to describe the stereochemical configuration corresponding to that of the natural homocyclic steroids, it is to be noted that in each instance, the compounds are racemic mixtures of the named compound and its enantiomorph.

The invention sought to be patented in a principal composition aspect is described as residing in the concept of a chemical compound having a 13β-alkyl-6-oxagonane nucleus unsaturated in the A-ring to which is attached at the 17-position, an alkylamino radical.

The tangible embodiments of the principal composition aspect of the invention possess the inherent general physical properties of being solids, are substantially insoluble in water, and are generally soluble in organic solvents such as ether and chloroform. Their physical characteristics taken together with their elemental analysis, the nature of the starting materials, and the mode of synthesis confirms the structure of the compositions sought to be patented.

The tangible embodiments of the principal composition aspect of the invention possess the inherent applied use characteristic of exerting a lowering effect on blood lipids as evidenced by pharmacological evaluation according to standard test procedures or being intermediates for the preparation of compositions which possess the inherent applied use characteristic of exerting a lowering effect on blood lipids as evidenced by pharmacological evaluation according to standard test procedures.

The invention sought to be patented in a second and subgeneric composition aspect is described as residing in the concept of a 13-alkyl-17-alkylamino-N-formyl-3-lower alkoxy-6-oxagona1,3,5(10)-triene.

The tangible embodiments of said second composition aspect possess the inherent general physical properties of being white crystalline solids, are substantially insoluable in water, and are generally soluable in organic solvents such as ether and chloroform. Examination of the compounds of said second composition aspect produced according to the hereinafter described process reveals, upon ultraviolet and infrared spectrographic analysis, spectral data confirming the molecular structure hereinbefore set forth. For example, the

frequency characteristic of 17-formamido group is evident. The aforementioned physical characteristics taken together with the elemental analysis, the nature of the starting materials and the mode of synthesis confirms the structure of the composition sought to be patented.

The tangible embodiments of the second composition aspect of the invention possess the inherent applied use characteristic of exerting a lowering effect on blood liquids as evidenced by pharmacological evaluation according to standard test procedures.

The tangible embodiments of the second composition aspect of the invention also possess the applied use characteristic of being intermediates for the preparation of compositions exerting a lowering effect on blood lipids as evidenced by pharmacological evaluation according to standard procedures.

The invention sought to be patented in a third composition aspect (subgeneric to the principal composition aspect) is described as residing in the concept of a 13-alkyl-17-alkylamino-N-methyl-3-lower alkoxy-6-oxagona-1,3,5(10)-triene.

The tangible embodiments of said third composition aspect possess the inherent general physical properties of being solids, are substantially insoluable in water, and are generally soluble in organic solvents such as ether and chloroform and in aqueous acid from which the acid salt can be obtained on evaporation of the water. The aforementioned physical characteristics taken together with the elemental analysis, the nature of the starting materials, and the mode of synthesis confirm the structure of the compositions sought to be patented.

The tangible embodiments of the third composition aspect of the invention possess the inherent applied use characteristic of exerting a lowering effect on blood lipids as evidenced by pharmacological evaluation according to standard test procedures. The tangible embodiments of the third composition aspect of the invention also possess the applied use characteristic of being intermediates for the preparation of compositions exerting a lowering effect on blood lipids as evidenced by pharmacological evaluation according to standard test procedures.

The invention sought to be patented in a fourth composition aspect (subgeneric to the principal composition aspect) is described as residing in the concept of a 13 - alkyl - 17 - ·alkylamino - N - methyl - 3 - lower alkoxy-6-oxagona-2,5(10)-diene.

The tangible embodiments of said fourth composition aspect possess the inherent general physical properties of being white crystalline solids, are substantially insoluble in water, and are generally soluble in organic solvents such as ether and chloroform, and in aqueous acid. The aforementioned physical characteristics taken together with the elemental analysis, the nature of the starting materials, and the mode of synthesis confirm the structure of the compositions sought to be patented.

The tangible embodiments of the fourth composition aspect of the invention possess the inherent applied use characteristic of being intermediates for the preparation of compositions exerting a lowering effect on blood lipids as evidenced by pharmacological evaluation according to standard test procedure.

The invention sought to be patented in a fifth composition aspect (subgeneric to the principal composition aspect) is described as residing in the concept of a 17-alkylamino-N-methyl-6-oxagona-4-en-3-one.

The tangible embodiments of said fifth composition aspect possess the inherent general physical properties of being white crystalline solids, are substantially insoluble in water, and are generally soluble in organic solvents such as ether and chloroform, and in aqueous acid from which the acid salt can be obtained on evaporation of the water. The aforementioned physical characteristics taken together with the elemental analysis, the nature of the starting materials, and the mode of synthesis confirm the structure of the compositions sought to be patented.

The tangible embodiments of the fifth composition aspect of the invention possess the inherent applied use characteristic of exerting a lowering effect on blood lipids as evidenced by pharmacological evaluation according to standard test procedures.

The manner and using the invention will now be generally described so as to enable a person skilled in the art of chemistry to make and use the same, as follows:

Referring to the drawing appended hereto, wherein the compositions are assigned Roman numerals for identification, the sequence of reactions involved in the synthesis of certain specific embodiments, namely $17\beta$-(N-isohexylformamido)-3-methoxy-13-methyl-6-oxagona-1,3,5(10)-triene (II),
N-isohexyl-3-methoxy-N,13-dimethyl-6-oxagona-1,3,5(10)-trien-$17\beta$-amine (III),
N-isohexyl-3-methoxy-N,13-dimethyl-6-oxagona-2,5(10)-dien-$17\beta$-amine (IV),
$17\beta$-[isohexyl(methyl)amino]-13-methyl-6-oxagon-4-en-3-one (V), is illustrated.

The 13-alkyl-3-lower alkoxy-6-oxagona-1,3,5(10)-trien-17-ones (I), starting materials for the preparation of the compositions of the invention, are prepared as described in copending U.S. application Ser. No. 483,528, filed Aug. 30, 1965. When a 13-alkyl-3-lower alkoxy-1,3,5(10)-trien-17-one is heated in a pressure container such as a Paar bomb or an autoclave at the temperature from about 160° C. to about 190° C. for from about 15 to 30 hours with formic acid and a primary amine, there is obtained after application of conventional isolation procedures a 13 - alkyl - 17 - alkylamino - N - formyl - 3 - lower alkoxy-6-oxagona-1,3,5(10)-triene (II). Reduction with an alkali metal aluminum hydride such as lithium aluminum hydride in a solvent, preferably dioxane, selectively converts the N-formyl group to N-methyl giving the corresponding 13 - alkyl - 17-alkylamino-N-methyl-3-lower alkoxy-6-oxagona-1,3,5(10)-triene (III). Birch reduction (lithium/liquid ammonia) of said 6-oxagona-1,3,5(10)-triene selectively reduces the A-ring to produce the 13-alkyl-17-alkylamino-N-methyl - 3 - lower alkoxy-6-oxagona-2,5(10)-diene (IV) and acid hydrolysis of the product results in the formation of the 13-alkyl-17-alkyl-amino-N-methyl-6-oxagona-4-en-3-one (V).

While the foregoing statements of the invention and description have recited the normal 6-oxagonane configuration for simplifying purposes, as used in this specification, it is intended to include the 6-oxa-8-isogonanes.

It will be apparent from the disclosure herein to those skilled in the art of organic chemistry that for the purposes of this invention, certain of the atoms of the 6 - oxagon - 1,3,5(10) - diene starting materials could be otherwise substituted with groups which do not interfere with the subsequent reactions. Thus the lower alkoxy group at the 3-position could be methoxy, as illustrated in the drawing, or it could be for example, but without limiting the generality thereof, ethoxy, propoxy, isopropoxy, butoxy; cycloalkoxy such as cyclopentyloxy, cyclohexyloxy. The alkyl group at the 13-position can be methyl or polycarbon alkyl such as for example, but without limiting the generality thereof, ethyl, propyl, butyl, and cetyl. Similarly, the 1, 2, 4 and 5 positions of the 6-oxagonatriene starting material could be substituted with groups which do not interfere with the course of the subsequent reactions.

The compounds of the invention having an amine moiety may usually be isolated as bases or as salts of pharmaceutically acceptable acids, except in the case of the gon-2,5(10)-diene which are hydrolyzed by acid.

The alkyl amine starting material may be any saturated primary alkyl amine such as for example, but without limiting the generality thereof, methylamine, ethylamine, butylamine, hexylamine, isopentylamine, isodecylamine. It may be diamine, provided one of the amino groups is a primary amino group and the second separated by at least two carbons is a tertiary amine. Thus, dimethylamino, ethylamine, dimethylamino, propylamine, diethylamino, butylamine could for example be used as starting materials.

When the starting compounds are substituted as hereinbefore recited, it will be apparent herefrom to those skilled in the art of chemistry that the intermediate products and the final products of the invention will bear correspondingly the same substituents. Therefore, for the purpose of this invention, the compositions produced in their inherent use are the full equivalents of the invention as particularly claimed.

The anti-lipemic activity of the compounds of the invention was demonstrated in standard test animals (see Recent Progress in Hormone Research, Vol. 22, page 308, Academic Press (1966)) by subcutaneous injection of 1 mg./day of test compound in adult male rats for nine days. On the tenth day the rats were autopsied and the level of cholesterol in the blood determined. Results obtained for representative compounds of the invention follow:

| Name of compound | Depression of cholesterol at 1 mg. level as compared to untreated control animals, percent |
| --- | --- |
| $17\beta$-(N-isohexylformamido)-3-methoxy-13-methyl-6-oxagona-1,3,5(10)-triene | 17 |
| N-(3-dimethylamino)propyl-13$\beta$-formamido-13-ethyl-3-methoxy-6-oxagona-1,3,5(10)-triene | 28 |
| N-isohexyl-13-ethyl-3-methoxy-N-methyl-6-oxa-8$\alpha$-gona-1,3,5(10)-trien-17$\beta$-amine | 37 |
| N-isohexyl-13-ethyl-3-methoxy-N-methyl-6-oxagona-1,3,5(10)-trien-17$\beta$-amine | 27 |
| N-isohexyl-3-methoxy-N,13-dimethyl-6-oxa-8$\alpha$-gona-1,3,5(10)-trien-17$\beta$-amine | 59 |
| N-[(3-dimethylamino)propyl]-N,13-dimethyl-3-methoxy-6-oxa-8$\alpha$-gona-1,3,5(10)-trien-17$\beta$-amine | 27 |
| 17$\beta$-[(3-diamethylamino)propyl]-methylamino-13-ethyl-3-methoxy-6-oxa-8$\alpha$-gona-1,3,5(10)-triene | 34 |
| 17$\beta$-[isohexyl(methyl)amino]-13-methyl-6-oxagona-4-en-3-one | 40 |

The compositions of the invention can be formulated for their anti-lipemic use as solid capsules, tablets, etc., by combing with conventional carriers. The effective dosage depends upon the particular compound used and the characteristic of the case and can be determined by conventional methods. Generally, a dosage range from 0.10 to about 15 mg. per kilogram of body weight per day represents the overall range.

The following example illustrates the best mode contemplated by the inventors of the manner of making the claimed compositions of the invention.

EXAMPLE (a) Preparation of $17\beta$-(N-isohexylformamido)-3-methoxy-13-methyl-6-oxagona-1,3,5(10)-triene Charge a Paar bomb with isohexylamine (2.0 g.), formic acid (2.0 ml.) and 3-methoxy-13-methyl-6-oxagona-1,3,5(10)-trien-17-one (1.0 g.), seal and heat at a range of from about 170°–180° C. for 20 hours. Cool and pour the reaction mixture into 15% sodium hydroxide solution (50 ml.) and extract with ether/benzene/chloroform (2:3:1). Combine the extracts, wash with 10% aqueous hydrochloric acid, water, saturated sodium bicarbonate and water. Dry over magnesium sulfate, remove the solvent under reduced pressure. Recrystallize the residue from ether/methanol to obtain 0.65 g. of 17β-(N-isohexylformamido)-3-methoxy - 13 - methyl-6-oxagona-1,3,5(10)-triene, M.P. 150–153°.

$\lambda_{max}^{KBr}$ 6.01, 6.19 and 6.34μ. $\lambda_{max}^{EtOH}$ 282 mμ(ε 3,580)

Analysis for $C_{25}H_{37}NO_3$.—Calculated: C, 75.08; H, 9.34; N, 3.51%. Found: C, 75.08; H, 9.23; N, 3.20%.

Modifications of substituents at the 13- and 17-positions and in isomerism at the 8-position are illustrated by the following compounds which can be prepared following the above procedure:

17β-(N-isohexylformamido)-13-ethyl-3-methoxy-6-oxa-8α-gona-1,3,5(10)-triene, M.P. 155–158°.
17β-(N-isohexylformamido)-13-ethyl-3-methoxy-6-oxagona-1,3,5(10)-triene, M.P. 134–138°.
17β-(N-isohexylformamido)-3-methoxy-13-methyl-6-oxa-8α-gona-1,3,5(10)-triene, M.P. 139–141°.
17β-(N-[3-(dimethylamino)propyl]formamido)-3-methoxy-13-methyl-6-oxagona-1,3,5(10)-triene, M.P. 120–123°.
17β-(N-[3-(dimethylamino)propyl]formamido)-3-methoxy-13-methyl-6-oxa-8α-gona-1,3,5(10)-triene, M.P. 157–161°.
13-ethyl-3-methoxy-17β-(N-[3-dimethylaminopropyl]formamido)-6-oxa-8α-gona-1,3,5(10)-triene.
N-(3-dimethylamino)propyl-17β-formamido-13-ethyl-3-methoxy-6-oxagona-1,3,5(10)-triene, M.P. 98–102°.

(b) Preparation of dl-N-isohexyl-3-methoxy-N,13-dimethyl-6-oxagona-1,3,5(10)-trien-17β-amine Add a solution of 17β - (N - isohexylformamido)-3-methoxy-13-methyl-6-oxagona-1,3,5(10)-triene (6.0 g.) in dioxane (75 ml.) with stirring to a refluxing slurry of lithium aluminium hydride (2.0 g.) in dioxane (75 ml.). Continue stirring at the reflux temperature for 20 hours. Decompose excess hydride by successive dropwise addition of aqueous dioxane (1:9) (20 ml.), 20% sodium hydroxide (2.0 ml.), and water (7 ml.). Separate the insoluble salts by filtering the hot reaction mixture. Wash the salts with isopropyl alcohol and add the washings to the filtrate. Concentrate the filtrate to dryness under reduced pressure. Triturate the residue with methanol to obtain N-isohexyl-3-methoxy - N,13 - dimethyl-6-oxagon-1,3,5(10)-trien-17β-amine (5.1 g.), M.P. 58–61.

$\lambda_{max}^{KBr}$ 3.66, 6.19 and 6.34μ. $\lambda_{max}^{EtOH}$ 280–89 mμ. (ε 2,340)

Analysis for $C_{25}H_{39}O_2N$.—Calculated: C, 77.87; H, 10.20; N, 3.63. Found: C, 77.62; H, 9.93; N, 3.54.

Modification of substituents at the 13- and 17-positions and in isomerism at the 8α-position are illustrated by the following compounds which can be prepared following the above procedure:

N-isohexyl-13-ethyl-3-methoxy-N-methyl-6-oxa-8α-gona-1,3,5(10)-trien-17β-amine.
13-ethyl-N-isohexyl-3-methoxy-N-methyl-6-oxagona-1,3,5(10)-trien-17β-amine.
N-isohexyl-3-methoxy-N,13-dimethyl-6-oxa-8α-gona-1,3,5(10)-trien-17β-amine, M.P. 59–62°.
N-[-(3-dimethylamino)propyl]-N,13-dimethyl-3-methoxy-6-oxagona-1,3,5(10)-trien-17β-amine.
N-[(3-dimethylamino)propyl]-N,13-dimethyl-3-methoxy-6-oxa-8α-gona-1,3,5(10)-trien-17β-amine dihydrochloride, M.P. 300–302° (dec.).
N-methyl-N-3-(3-dimethylamino)propyl-17β-amino-13-ethyl-3-methoxy-6-oxagona-1,3,5(10)-triene dihydrochloride, M.P. (Kofler) 254–257° precipitated from ether.
17β-([3-dimethylamino]propyl)methylamino-13-ethyl-3-methoxy-6-oxa-8α-gona-1,3,5(10)-triene.

(c) Preparation of N-isohexyl-3-methoxy-N,13-dimethyl-6-oxa-gona-2,5(10)-dien-17β-amine Add with stirring a solution of N-isohexyl-3-methoxy-N,13 - dimethyl - 6 - oxagona - 1,3,5(10) - trien - 17β-amine (1.0 g.) in tetrahydrofuran (200 ml.) to distilled liquid ammonia (350 ml.). Add lithium metal (0.6 g.) in small pieces. After 3–12 hours, destroy the blue color which forms by dropwise addition of absolute ethanol (150 ml.). Bring the mixture to room temperature by cautiously adding warm water. Extract the product diene with ether. Wash the extracts with water and dry over anhydrous sodium sulfate. Remove the solvent and recrystallize the residue from methanol to obtain N-isohexyl-3-methoxy - N,13 - dimethyl - 6 - oxagona - 2,5(10) - dien-17β-amine (800 mg.), M.P. 72–74°.

$\lambda_{max}^{KBr}$ 5.89, 6.00μ

Following the procedure the compounds listed at the end of section b can be converted to the corresponding 6-oxagona-2,5(10)-dien-17-amines.

(d) Preparation of 17β-[isohexyl(methyl)amino]-13-methyl-6-oxagona-4-en-3-one

Stir N - isohexyl - 3 - methoxy - N,13 - dimethyl - 6-oxagona-2,5(10)-dien-17β-amine (400 mg.) in water (38 ml.) containing concentrated aqueous hydrochloric acid (4 ml.) for three hours at room temperature. Add some additional water and neutralize with saturated sodium bicarbonate. Extract with ether, wash the combined extracts with water, 2% aqueous sodium hydroxide, water, and dry over anhydrous sodium sulfate. Remove the solvent, dissolve the residue in hexane and filter to remove solid material. Remove the solvent from the hexane solution to obtain 17β-[isohexyl(methyl)amino]-13-methyl-6-oxagona-4-en-3-one (220 mg.);

$\lambda_{max}^{EtOH}$ 260 mμ(ε 19,400). $\lambda_{max}^{NaCl}$ 3.45, 3.52, 3.65, 6.04, 6.23 and 8.47μ.

Analysis for $C_{24}H_{39}O_2$.—Calculated: C, 77.16; H, 10.52; N, 3.75%. Found: C, 76.92; H, 10.40; H, 3.94%.

The subject matter which the applicants regard as their invention is particularly pointed out and distinctly claimed as follows:

1. A compound of the structure

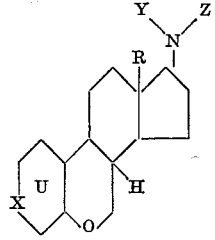

wherein

U represents A-ring unsaturation selected from the group consisting of 1,3,5(10)-triene, 2,5(10)-diene and 4-ene,
R is lower alkyl,
H is α or β,
X is lower alkoxy methine when U is 1,3,5(10)-triene or 2,5-triene, and keto when U is 4-ene,
Y is formyl or methyl, and
Z is lower alkyl.

2. 17β-(N-isohexylformamido)-3-methoxy-13-methyl-6-oxagona-1,3,5(10)-triene.
3. 17β-(N-isohexylformamido)-13-ethyl-3-methoxy-6-oxa-8α-gona-1,3,5(10)-triene.
4. 17β-(N-isohexylformamido)-13-ethyl-3-methoxy-6-oxagona-1,3,5(10)-triene.
5. 17β-(N-isohexylformamido)-3-methoxy-13-methyl-6-oxa-8α-gona-1,3,5(10)-triene.
6. 17β-(N-[3-(dimethylamino)propyl]formamido)-3-methoxy-13-methyl-6-oxagona-1,3,5(10)-triene.
7. 17β-(N-[3-(dimethylamino)propyl]formamido)-3-methoxy-13-methyl-6-oxa-8α-gona-1,3,5(10)-triene.
8. 13-ethyl-3-methoxy-17β(N-[3-dimethylaminopropyl]formamido)-6-oxa-8α-gona-1,3,5(10)-triene.

9. N-(3-dimethylamino)propyl-17β-formamido-13-ethyl-3-methoxy-6-oxagona-1,3,5(10)-triene.
10. N-isohexyl-3-methoxy-N,13-dimethyl-6-oxagona-1,3,5(10)-trien-17β-amine.
11. N-isohexyl-13-ethyl-3-methoxy-N-methyl-6-oxa-8α-gona-1,3,5(10)-trien-17β-amine.
12. 13-ethyl-N-isohexyl-3-methoxy-N-methyl-6-oxagona-1,3,5(10)-trien-17β-amine.
13. N-isohexyl-3-methoxy-N,13-dimethyl-6-oxa-8α-gona-1,3,5(10)-trien-17β-amine.
14. N-[(3-dimethylamino)propyl]-N,13-dimethyl-3-methoxy-6-oxagona-1,3,5(10)-trien-17β-amine.
15. N-[(3-dimethylamino)propyl]-N,13-dimethyl-3-methoxy-6-oxa-8α-gona-1,3,5(10)-trien-17β-amine.
16. 17β-[(3-dimethylamino)propyl]methylamino-13-ethyl-3-methoxy-6-oxagona-1,3,5(10)-triene.
17. 17β-[(3-dimethylamino)propyl]methylamino-13-ethyl-3-methoxy-6-oxa-8α-gona-1,3,5(10)-triene.
18. N-isohexyl-3-methoxy-N,13-dimethyl-6-oxagona-2,5(10)-dien-17β-amine.
19. 17β-[isohexyl(methyl)amino]-13-methyl-6-oxa-gona-4-en-3-one.

References Cited

UNITED STATES PATENTS

| | | | |
|---|---|---|---|
| 3,080,380 | 3/1963 | Atwater et al. | 260—345.3 |
| 3,407,214 | 10/1968 | Douglas et al. | 260—345.3 |

HENRY R. JILES, Primary Examiner

J. M. FORD, Assistant Examiner

U.S. Cl. X.R.

260—999